2,741,580

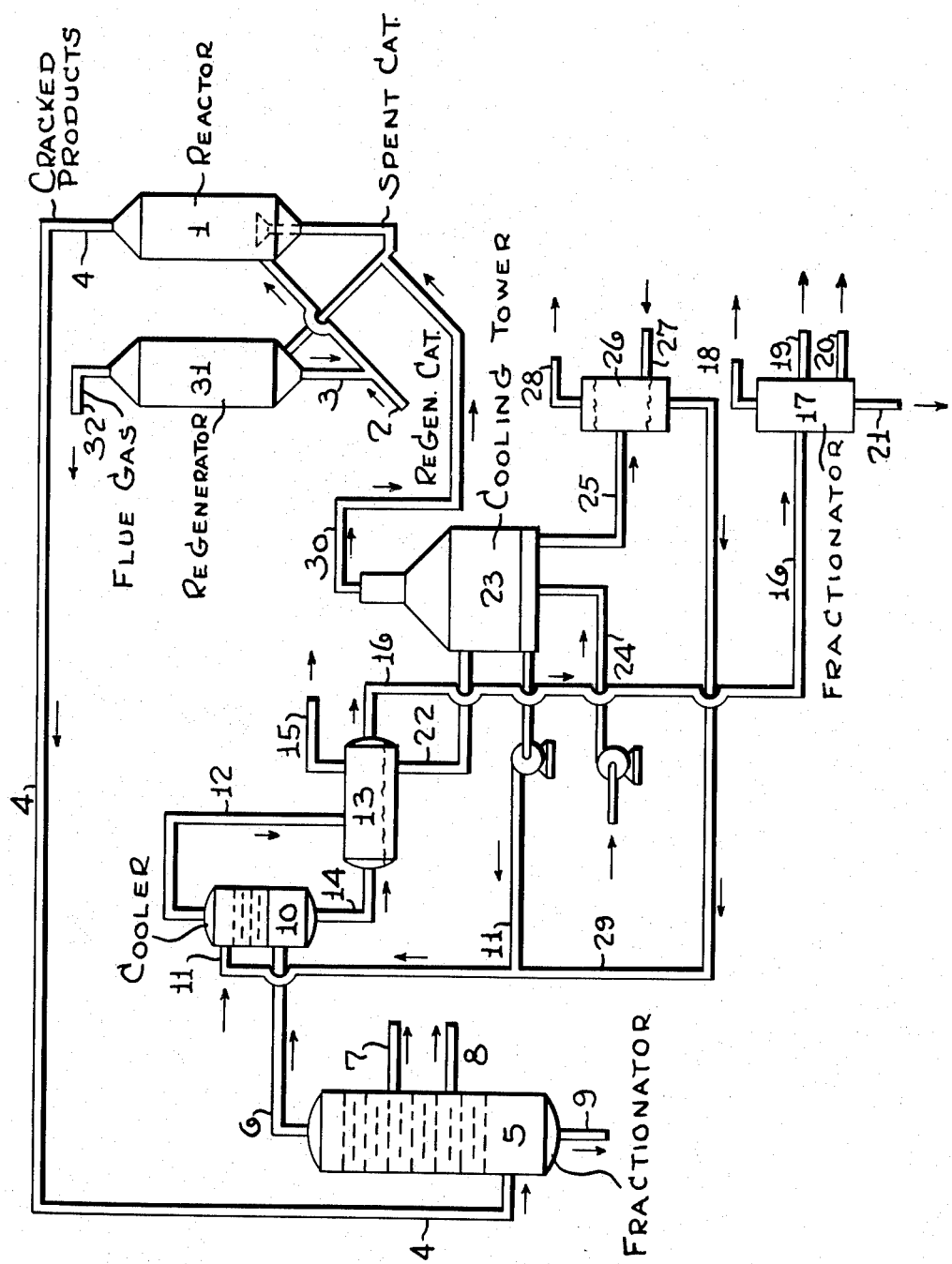

INTEGRATED CATALYTIC CRACKING PROCESSING SYSTEM

Walter H. Rupp, Mountainside, and Channing C. Nelson, Cranford, N. J., assignors to Esso Research and Engineering Company, a corporation of Delaware Application July 28, 1952, Serial No. 301,352

4 Claims. (Cl. 196—24)

The present invention is concerned with an improved process for the preparation of low sulfur petroleum products. The invention is more particularly concerned with an integrated operation for the removal of sulfur compounds from petroleum fractions, particularly from those petroleum fractions secured from fluid catalytic cracking operations.

It is well known in the art to contact hydrocarbon feed fractions with catalyst under temperature and pressure conditions adapted to produce lower boiling fractions. It also is known in the art to contact vaporous streams containing sulfur compounds, as for example, hydrogen sulfide with various scrubbing medium such as ethanolamine solution, caustic, and the like. In accordance with the present invention, an improved operation is secured particularly in the processing of catalytically cracked stocks by directly contacting the vaporous stream from the fractionator with a diethanolamine solution under conditions to condense the hydrocarbons and remove the sulfur compounds. The amine solution is then cooled utilizing air followed by passing the warm contaminated air as a source of oxygen for burning the carbon in the regenerator of the fluidized cracking unit. The process of the present invention may be more fully understood by reference to the drawing illustrating an embodiment of the same.

The fluid catalytic cracking operation comprises three sections: cracking, regeneration, and fractionation. The cracking reaction takes place continuously in one reactor, the spent catalyst being removed continuously for regeneration in a separate vessel, from which it is returned to the cracking vessel. Continuity of flow of catalyst as well as of oil is thus accomplished, and the characteristic features of fixed-bed designs involving the intermittent shifting of reactors through cracking, purging, and regeneration cycles are eliminated.

Regenerated catalyst is withdrawn from the regenerator and flows by gravity down a standpipe, wherein a sufficiently high pressure head is built up on the catalyst to allow its injection into the fresh liquid oil stream. The resulting mixture of oil and catalyst flows into the reaction vessel, in which gas velocity is intentionally low, so that a high concentration of catalyst will result. The cracking that takes place results in carbon deposition on the catalyst, requiring regeneration of the catalyst. The cracked product oil vapors are withdrawn from the top of the reactor after passing through cyclone separators to free them of any entrained catalyst particles, while the spent catalyst is withdrawn from the bottom of the reactor and is injected into a stream of undiluted air which carries the catalyst into the regeneration vessel. The products of combustion resulting from the regeneration of the catalyst leave the top of this vessel and pass through a series of cyclones where the bulb of the entrained catalyst is recovered. The regenerated catalyst is withdrawn from the bottom of the vessel to complete its cycle.

Again referring specifically to the drawing, in accordance with a specific preferred adaptation of the present invention a gas oil feed is introduced into fluidized catalyst reaction zone 1 by means of feed line 2. Prior to introducing the oil into zone 1 it is mixed with regenerated catalyst introduced into line 2 by means of line 3.

Temperature and pressure conditions in cracking zone 1 are adjusted to secure the desired conversion of the feed oil. Cracked products are withdrawn from the top of zone 1 by means of line 4 and passed into a fractionation zone 5. Temperature and pressure conditions in fractionation zone 5 are adjusted to remove overhead by means of line 6 hydrocarbon constituents boiling in the gasoline and lower boiling ranges. A heating oil fraction is removed from zone 5 by means of line 7 while a higher boiling fraction is removed by means of line 8. A bottoms stream is removed from zone 5 by means of line 9.

The vaporous hydrocarbon stream containing hydrogen sulfide is passed into a direct contact cooler 10 wherein the same is contacted with a condensing and sulfur absorbing agent, as for example, a solution comprising diethanolamine. The diethanolamine is introduced into zone 10 by means of line 11. Uncondensed vapors are withdrawn overhead from zone 10 by means of line 12 and passed into a separation zone 13.

The diethanolamine solution and condensed hydrocarbon constituents are removed from the bottom of zone 10 by means of line 14 and passed into separation zone 13, wherein a phase separation occurs between the scrubbing solution and the condensed hydrocarbons. Uncondensed gases are removed from the top of separation zone 13 by means of line 15, while the hydrocarbon fraction comprising relatively low boiling hydrocarbon constituents is removed as a liquid phase by means of line 16. This phase is passed into a second fractionator 17 wherein temperature and pressure conditions are adjusted to remove overhead by means of line 18 hydrocarbon constituents boiling below the motor fuel boiling range. A stream comprising hydrocarbon constituents boiling in the motor fuel boiling range is removed by means of line 19 while higher boiling hydrocarbons are removed by means of lines 20 and 21 respectively.

In accordance with the present invention, the diethanolamine solution which is relatively hot is withdrawn from separation zone 13 by means of line 22 and passed to a cooling tower 23 wherein the same is cooled by air which is introduced into tower 23 by means of line 24. A portion of the cooled diethanolamine solution is segregated by means of line 11 and recycled to the top of direct contacting cooler 10. Another portion of the cooled diethanolamine solution is withdrawn from cooling tower 23 by means of line 25 and passed to a regeneration zone 26. In zone 26 steam is introduced by means of line 27 which will remove from the diethanolamine absorbed hydrogen sulfide, carbon dioxide, mercaptans and the like. These impurities are removed overhead from stripping zone 26 by means of line 28. The regenerated diethanolamine solution is removed from the bottom of zone 26 by means of line 29 and recycled to the top of zone 10.

In accordance with the present invention, the hot air secured as a result of cooling the diethanolamine solution in cooling tower 23 is withdrawn by means of line 30 and mixed with spent catalyst withdrawn from zone 1. This hot air along with the spent catalyst is passed to regeneration zone 31 wherein the carbon is burned from the catalyst. Flue gases are removed overhead from regeneration zone 31 by means of line 32 while the regenerated catalyst is withdrawn from the bottom of regeneration zone 31 by means of line 3.

The fluidized solids technique for processing feed fractions, as for example, gas oils, heavy residuums and other feed stocks for the production of hydrocarbon fractions boiling in the motor fuel boiling range is a conventional one. As pointed out heretofore, the system of a fluidized solids technique comprises a reaction zone and a regeneration zone, employed in conjunction with a fractionation zone. The reactor and the catalyst regenerator are arranged at approximately an even level. The operation of the reaction zone and the regeneration zone is conventional, which preferably is as follows:

An overflow pan is provided in the regeneration zone at the desired catalyst level. The catalyst overflows into a withdrawal line which preferably has the form of a U-shaped seal leg connecting the regeneration zone with the reaction zone. The feed stream introduced is usually preheated to a temperature in the range from about 500° to 650° F. in exchangers in heat exchange with regenerator flue gases which are removed overhead from the regeneration zone, or with cracked products. The heated feed stream is withdrawn from the exchanges and introduced into the reactor. The seal leg is usually sufficiently below the point of feed oil injection to prevent oil vapors from backing into the regenerator in case of normal surges. Since there is no restriction in the overflow line from the regenerator, satisfactory catalyst flow will occur as long as the catalyst level in the reactor is slightly below the catalyst level in the regenerator when vessels are carried at about the same pressure. Spent catalyst from the reactor flows through a second U-shaped seal leg from the bottom of the reactor into the bottom of the regenerator. The rate of catalyst flow is controlled by injecting some of the air into catalyst transfer line to the regenerator.

The pressure in the regenerator may be controlled at the desired level by a throttle valve in the overhead line from the regenerator. Thus, the pressure in the regenerator may be controlled at any desired level by a throttle valve which may be operated, if desired, by a differential pressure controller. If the pressure differential between the two vessels is maintained at a minimum, the seal legs will prevent gases from passing from one vessel into the other in the event that the catalyst flow in the legs should cease.

The reactor and the regenerator may be designed for high velocity operation involving linear superficial gas velocities of from about 2.5 to 4 feet per second. However, the superficial velocity of the upflowing gases may vary from about 1–5 and higher. Catalyst losses are minimized and substantially prevented in the reactor by the use of multiple stages of cyclone separators. The regeneration zone is provided with cyclone separators. These cyclone separators are usually from 2 to 3 and more stages.

Distributing grids may be employed in the reaction and regeneration zones. Operating temperatures and pressures may vary appreciably depending upon the feed stocks being processed and upon the products desired. Operating temperatures are, for example, in the range from about 800° to 1100° F., preferably about 850° to 950° F., in the reaction zone and 1000° to 1100° F. in the regeneration zone. Elevated pressures may be employed, but in general pressures below 100 lbs. per sq. in. gauge are utilized. Pressures generally in the range from 1 to 30 lbs. per sq. in. gauge are preferred. A catalyst holdup corresponding to a space velocity of 1 to 20 weights per hour of feed per weight of catalyst is utilized. A preferred ratio is 2 to 4. Catalyst to oil ratios of about 3 to 10, preferably about 6 to 8 by weight are used.

The catalytic materials used in the fluidized catalyst cracking operation, in accordance with the present invention, are conventional cracking catalysts. These catalysts are oxides of metals of groups II, III, IV and V of the periodic table. A preferred catalyst comprises silica-alumina wherein the weight per cent of the alumina is in the range from about 5 to 20%. Another preferred catalyst comprises silica-magnesium where the weight per cent of the magnesia is about 5% to 20%. These catalysts may also contain a third constituent, as for example, $ThO_2$, $WO_3$, $MoO$ $BeO$, $Bi_2O_3$, $CdO$, $UO_3$, $B_2O_3$, $SnO_2$, $Fe_2O_3$, $V_2O_5$, $MnO$, $Cr_2O_3$, $CaO$, $Tl_2O_3$, $MgO$ and $Ce_2O_3$ present in the concentration from 0.05% to 0.5%. The size of the catalyst particles is usually below about 200 microns. Usually at least 50% of the catalyst has a micron size in the range from about 20 to 80. Under these conditions with the superficial velocities as given, a fluidized bed is maintained wherein the lower section of the reactor, a dense catalyst phase exists while in the upper area of the reactor a dispersed phase exists.

The absorption stage comprises a typical operation utilizing a liquid absorbent which can be regenerated with recovery of hydrogen sulfide. The preferred solvent comprises an ethanolamine solvent, preferably mono-ethanolamine. Tri-ethanolamine may also be employed. Another satisfactory solvent is glycol amine and the like. Generally the temperature of the overhead vapors from the fractionator is in the range from about 200 to 500° F. The temperature of the gases, however, is usually in the range from about 300° F. to 430° F. The amount of liquid absorbent circulated is a function of the desired heat to be removed from these vapors in order to secure the desired degree of condensation of the constituents. Normally, the absorbent is introduced into the direct cooling zone at a temperature in the range from 70° F. to 90° F. It is preferred that sufficient absorbent be utilized so as not to secure a temperature rise of the absorbent greater than about 20° F. and preferably not over about 10° F.

By the process of the present invention, not only are the vaporous hydrocarbon constituents condensed in an efficient manner, but undesirable hydrogen sulfide is removed from these hydrocarbon fractions. Furthermore, the heat is then utilized in the regenerator in a manner as described.

What is claimed is:

1. Process for the production of a hydrogen sulfide free hydrocarbon fraction boiling in the motor fuel boiling range from a sulfur containing hydrocarbon feed fraction boiling above the motor fuel boiling range which comprises subjecting the feed fraction in a reaction zone to temperature and pressure conditions in the presence of a fluidized cracking catalyst to convert at least a portion of the feed fraction to hydrogen sulfide and hydrogen constituents boiling in the motor fuel boiling range, withdrawing fluidized catalyst from said reaction zone and passing the same to a catalyst regeneration zone, withdrawing from said reaction zone a vaporous product fraction containing hydrogen sulfide and hydrocarbons boiling in the motor fuel boiling range, passing said product fraction to a fractionating zone and removing a vaporous overhead fraction from said fractionating zone including said hydrocarbons boiling in the motor fuel boiling range and hydrogen sulfide, passing said overhead fraction to a condensing zone wherein the overhead fraction is directly contacted with a liquid ethanolamine having an absorbent capacity for hydrogen sulfide, maintaining conditions within the condensing zone to secure substantially complete condensation of said hydrocarbons boiling in the motor fuel boiling range and substantially complete absorption of the hydrogen sulfide by the ethanolamine, withdrawing ethanolamine containing hydrogen sulfide and the condensed hydrocarbons from the condensing zone and passing the same to a separation zone, segregating said condensed hydrocarbons from the hydrogen sulfide containing ethanolamine within the separation zone, separately withdrawing the segregated ethanolamine and the condensed hydrocarbons from the separation zone, passing the ethanolamine to a cooling zone and therein contacting and cooling the same with air, separately removing the resulting heated air and cooled ethanolamine from the cooling zone, passing the heated air to said catalyst regeneration zone and therein contacting the same with said spent catalyst under temperature and pressure conditions adapted to regenerate the catalyst, and recycling at least a portion of the cooled ethanolamine to said condensing zone.

2. A process as defined in claim 1 in which at least a portion of the ethanolamine from the cooling zone is regenerated to remove hydrogen sulfide therefrom.

3. A process as defined in claim 1 in which the quantity of ethanolamine introduced within said condensing zone is sufficient so that the temperature of the ethanolamine does not increase more than 20° F.

4. A process as defined in claim 1 in which the ethanolamine is triethanolamine.

References Cited in the file of this patent

UNITED STATES PATENTS

| | | |
|---|---|---|
| 1,986,228 | Seguy | Jan. 1, 1935 |
| 2,220,138 | Wood | Nov. 5, 1940 |
| 2,306,843 | Reed | Dec. 29, 1942 |
| 2,378,064 | Conn | June 12, 1945 |
| 2,614,066 | Cornell | Oct. 14, 1952 |